United States Patent [19]
Downie

[11] Patent Number: 4,738,402
[45] Date of Patent: * Apr. 19, 1988

[54] WASTE RECOVERY SYSTEM

[76] Inventor: William J. Downie, 1430 Rancho Rd., Arcadia, Calif. 91006

[*] Notice: The portion of the term of this patent subsequent to Oct. 7, 2003 has been disclaimed.

[21] Appl. No.: 888,481

[22] Filed: Jul. 22, 1986

Related U.S. Application Data

[63] Continuation-in-part of Ser. No. 627,062, Jul. 2, 1984, Pat. No. 4,615,492.

[51] Int. Cl.⁴ .............................................. B02C 18/40
[52] U.S. Cl. ...................... 241/46 R; 162/4; 162/261; 241/93; 241/101.2; 241/152 R; 241/277
[58] Field of Search ...................... 241/46 R, 42, 46.02, 241/46.17, 83, 91, 93, 101 R, 101.2, 277, 152 R, 152 A, 154, 74, 76, 78, 79, 62, 79.3, 46.06; 162/4, 261

[56] References Cited

U.S. PATENT DOCUMENTS 1,181,967  5/1916  White ................................ 162/4 X
2,775,168 12/1956  Baxter, Jr. ..................... 241/46 R X

FOREIGN PATENT DOCUMENTS 706062 3/1954 United Kingdom ............ 241/46.06

Primary Examiner—Howard N. Goldberg
Assistant Examiner—Joseph M. Gorski
Attorney, Agent, or Firm—William W. Haefliger

[57] ABSTRACT

Waste material pulping process includes
(a) providing tank structure having an inlet and an outlet, and forming sequential zones through which waste material passes, including first, second and third zones,
(b) providing a shredding and mulching rotor carried by the tank to rotate in the second zone, said rotor being porous and hollow and having waste mulching ribs positioned to impact and shred waste material passed to the rotor as the rotor rotates so that the shredded waste material passes into the rotor hollow wherein it is mulched as the rotor rotates,
(c) passing liquid into the tank to penetrate the waste received in the first zone and the shredded waste in the second zone and within the rotor hollow, and to carry the mulched waste into the third zone, in slurry form;
(d) and processing said slurry downstream of said outlet to produce solid form, usable end product waste material.

9 Claims, 5 Drawing Sheets

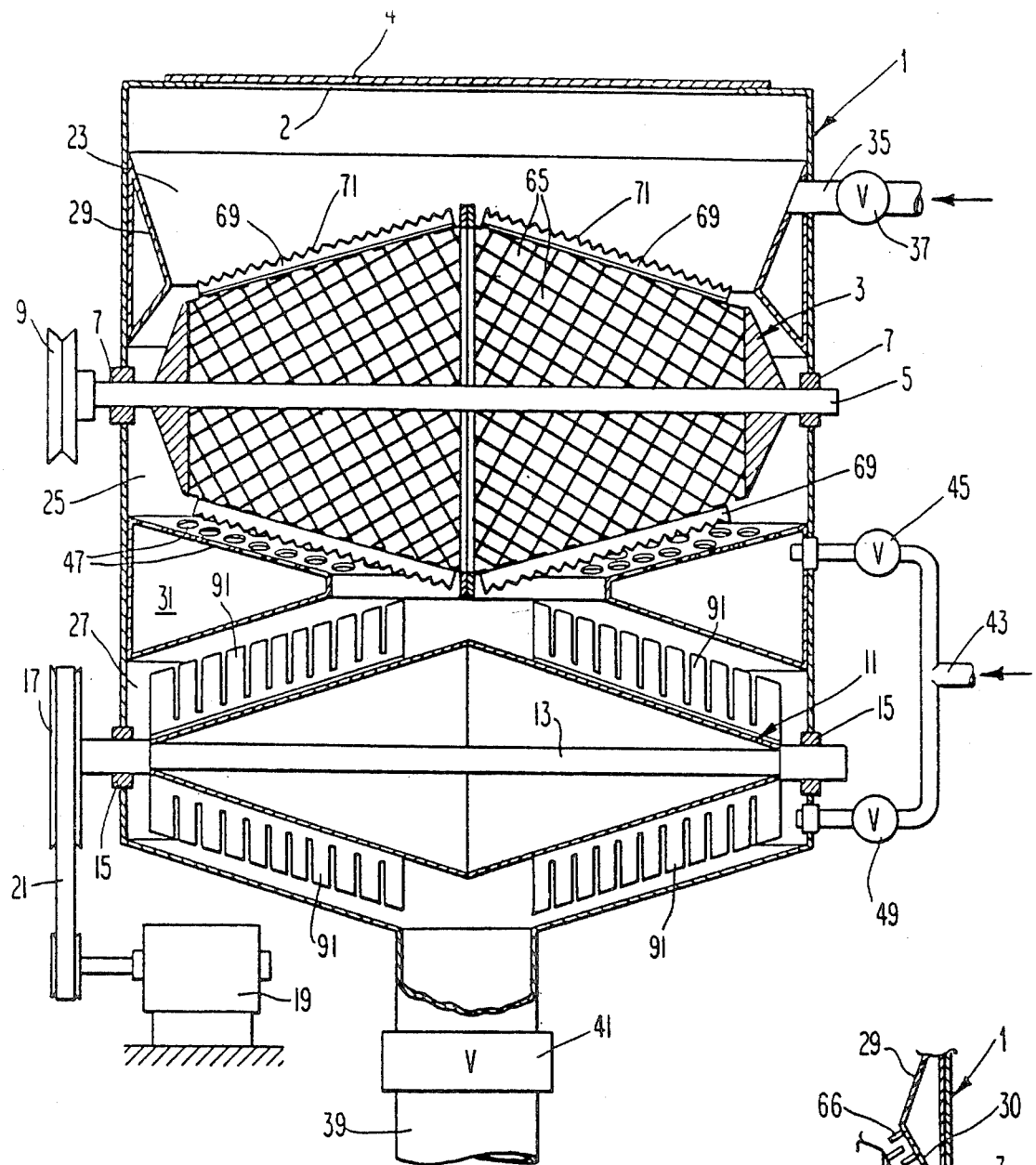
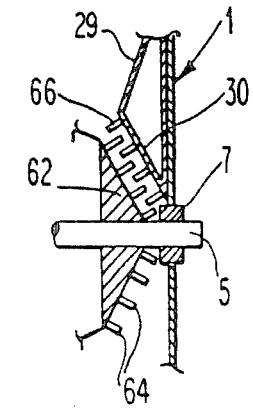
Fig. 1
Fig. 1A

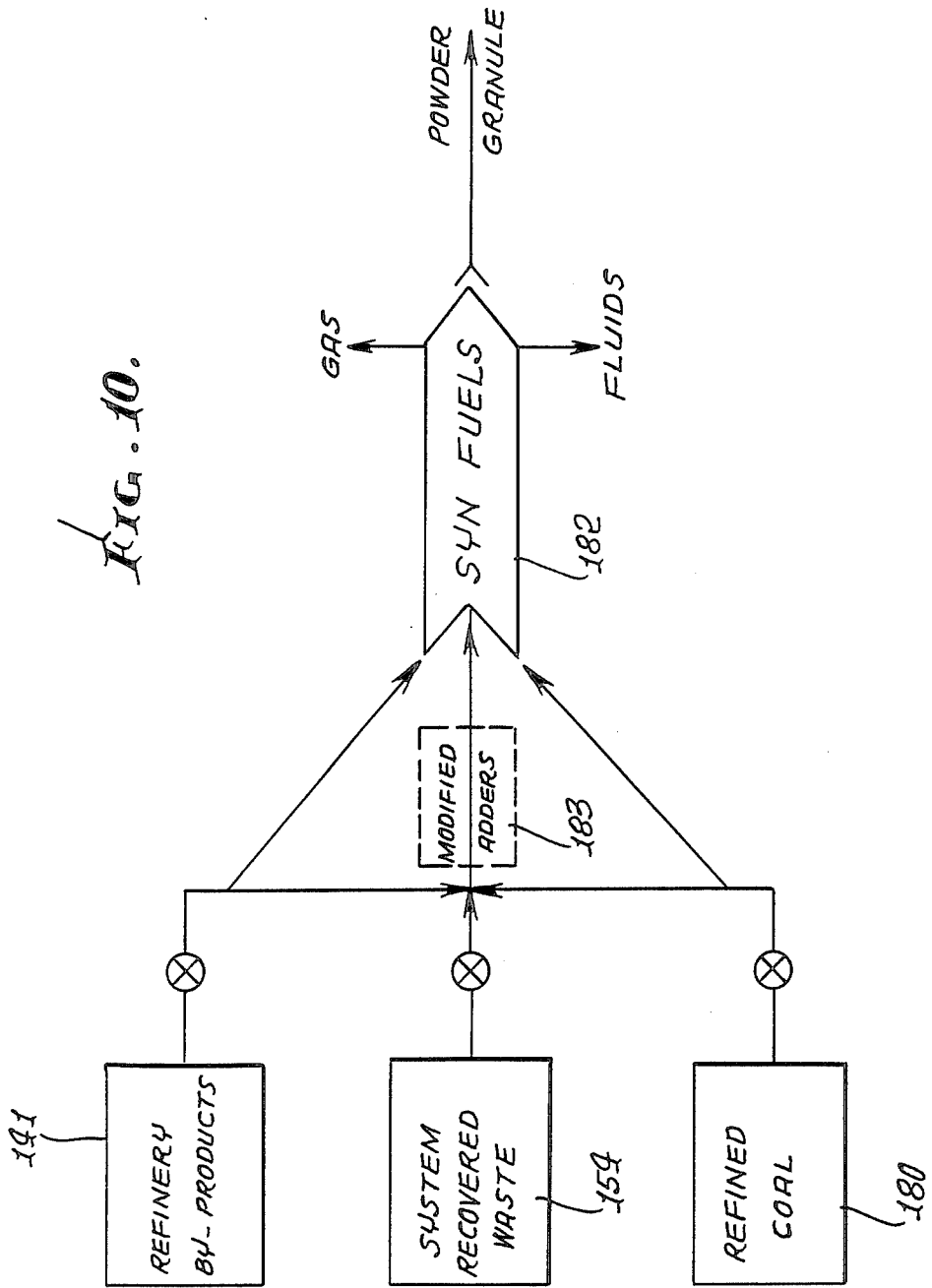

WASTE RECOVERY SYSTEM

BACKGROUND OF THE INVENTION

This application is a continuation-in-part of Ser. No. 627,062, filed July 2, 1984 now U.S. Pat. No. 4,615,492.

This invention relates generally to waste handling and more particularly to system and method capable of treating pulped or comminuted material. The latter may be produced, for example by pulping apparatus, as for example, fibrous sheet material in the form of paper, pulp board, and cardboard, whereby the fibrous constituents may be recovered for subsequent reuse or discharged to a sewer system.

There is a continual need for disposal of waste materials, and particularly fibrous materials such as waste paper and cardboard and converting the shredded material into a fibrous slurry; and such need requires available and easily installed systems, particularly the initial pulping means.

SUMMARY OF THE INVENTION

It is a major object of the invention to provide method and system to meet the above need. Basically, the pulping apparatus for initially pulping the waste material comprises:

(a) tank structure having an inlet and an outlet, and forming sequential zones through which waste material passes, including first, second and third zones, (b) a shredding and mulching rotor carried by the tank to rotate in the second zone, said rotor being porous and hollow and having waste mulching ribs positioned to impact and shred waste material passed to the rotor as the rotor rotates so that the shredded waste material passes into the rotor hollow wherein it is mulched as the rotor rotates, (c) means to pass liquid into the tank to penetrate the waste received in the first zone and the shredded waste in the second zone and within the rotor hollow, and to carry the mulched waste into the third zone, (d) a second rotor carried by the tank to rotate in the third zone, and having ribs adapted to impact and disintegrate the mulched waste material received by the second rotor, as it rotates at high speed in said liquid, thereby to form a waste slurry passing to said outlet;

(e) and means to rotate said rotors.

As will appear, the first zone is advantageously located above the level of the second zone, and the second zone is above the level of the third zone, and said means to pass liquid into the tank includes water inlets to at least two of said zones; and baffle means may be provided between the second and third zones and forming a passage communicating between said second and third zones, and a water supply plenum about said passage, there being openings in said baffle means below said first rotor to supply flush water to the underside of the first rotor and to said passage. Further, the rotors may effectively comprise drums which define axes of rotation transverse to the general direction of waste flow sequentially through said zones.

It is another and major object of the invention to provide a slurry processing apparatus downstream of said outlet for processing said slurry into solid form, usable end product waste material, thereby to define a highly effective waste processing system capable of producing usable products.

The processing system provides a means for handling fluids and solids that are disintegratable and blendable whereby the constituents can be recoverable for subsequent use and recyclable in their entirity; it provides an efficient uncomplex sequence of conveyance, blending, and processing as a method of converting raw substances into reusable, consumable products; and it also provides apparatus of design whereby it will readily handle any volume and type of fibrous material, fluid material, or substance that is safe for reprocessing.

In addition, the system provides a novel means of processing whereby the natural flow substances and current flow system of sewers can carry and blend the additional load and also accept adders as they are strategically applied. Such susbstances are prepared and inserted into the process by mulching, disintegrating and discharging directly into the flow stream or to a remote station.

The apparatus of the present invention includes the feeder, mechanical storage treatment, adder facilitates and apparatus, holding tanks, separator, extractor processor, and treatment and process mechanisms, and conveyance transfer mechanisms that conclude with recycle, intermittent use or direct use and application of the end product.

These and other objects and advantages of the invention, as well as the details of an illustrative embodiment, will be more fully understood from the following specification and drawings, in which:

DRAWING DESCRIPTION

FIG. 1 is an elevational view, partly in section, of the apparatus, of the present invention;

FIG. 1a is a partial sectional view illustrating a preferred modification of the end plates of the shredding-mulching drum;

Figure 2:
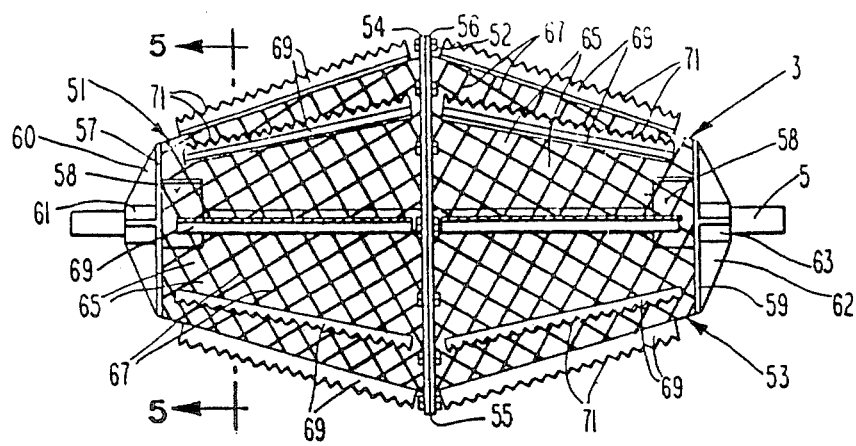
FIG. 2 is an elevational view of the shredding-mulching
Figure 5:
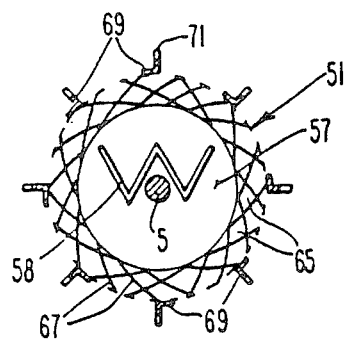
Figure 4:
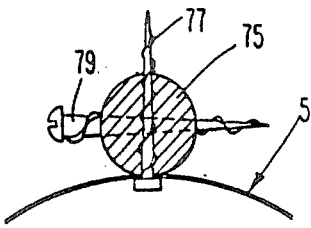
Figure 3:
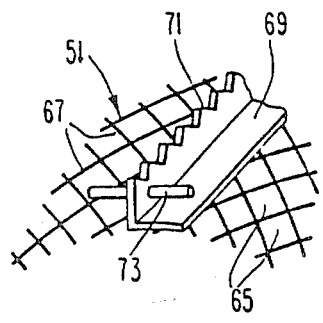
Figure 6:
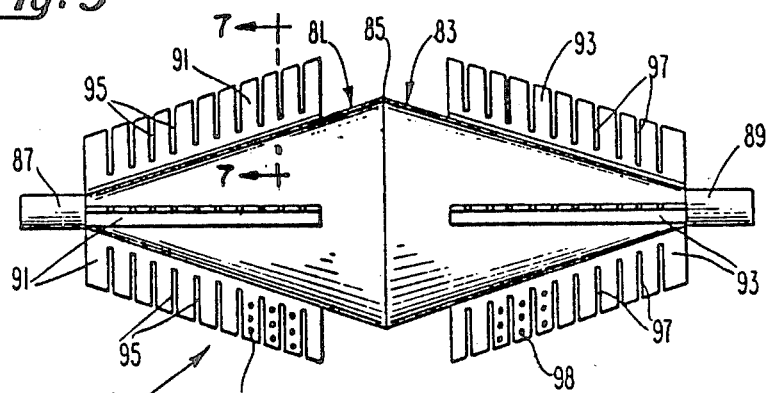
Figure 7:
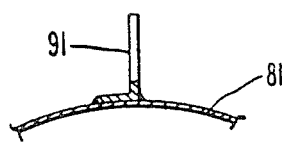

FIG. 3. is a partial view of the surface of the drum illustrating a disintegrating rib secured to the surface of the drum of FIG. 2;

FIG. 4 is an end view of a portion of the drum illustrating a further type of disintegrating means secured to the surface of the drum of FIG. 2;

FIG. 5 is a sectional view taken on lines 5—5 of the drum of FIG. 2;

FIG. 6 is an elevational view of the drum adapted to form the fibrous slurry; and FIG. 7 is a sectional view taken on line 7—7 of FIG. 6.

Figure 8:
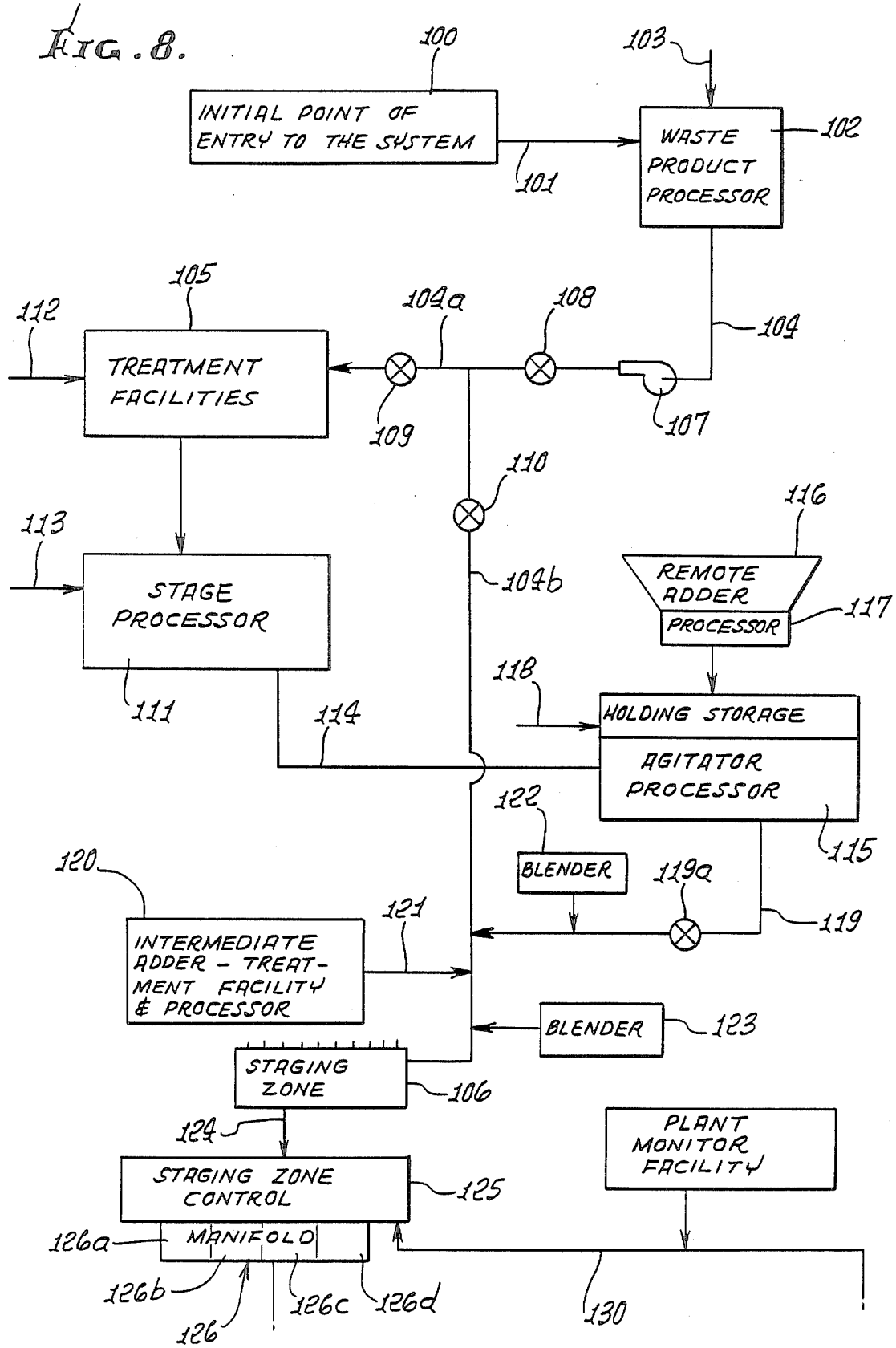
Figure 9:
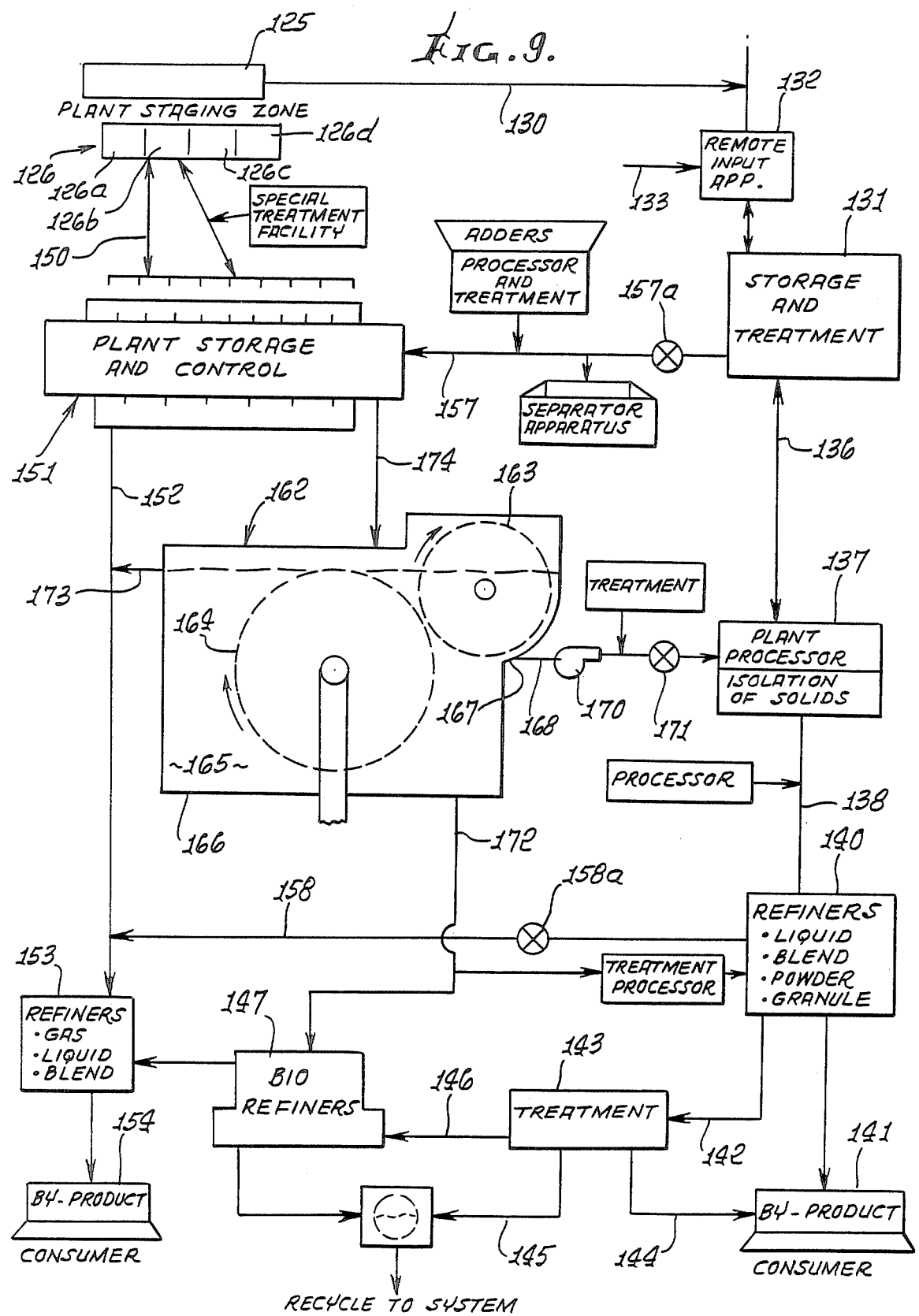

FIGS. 8-10 are system flow diagrams.

DETAILED DESCRIPTION

Referring to the drawings illustrating a preferred structure, the rotatable rotors such as drums are mounted within a suitable tank 1 which may be cylindrical or rectangular in cross section and is open at its upper end as at 2. A removable cover or lid 4 is provided as a closure. The means for disintegrating or shredding of the wet stock into clumps comprises a rotatable drum 3 which is disposed on shaft 5 journaled in suitable bearings 7 mounted in the walls of tank 1. The shaft 5 is provided with a pulley 9 mounted on the shaft externally of the tank. The pulley is driven by a motor (not shown). Means for converting the mulched clumps into a fibrous slurry comprises a dispersing drum 11 disposed beneath shredding drum 3. The dispersing drum 11 is mounted on a shaft 13 journaled in suitable bearings 15 mounted in the side walls of tank 1.

The shaft 13 is provided with a pulley 17 externally of the tank and is driven by a motor 19. The pulleys 9 and 17 may be driven by either a belt or chain. A belt 21 is shown as the drive means between motor 19 and pulley 17. Preferably, independent motors are provided as the driving means, the disintegrating or shredding drum 3 being operated at a relatively high speed.

The tank is divided into an upper compartment 23, and intermediate compartment 25 and a lower compartment 27 by suitable baffles 29 and 31. Water is supplied to the tank through pipeline 35 the supply being regulated by valve 37. The water is maintained at a level above the shredding drum 3, preferably at a level of at least that of the pipeline 35. The open top of the tank 1 may be closed by a removable cover 2 when the apparatus is not in operation. The final fiber slurry is discharged from the bottom of tank 1 through pipeline 39 and valve 41.

At the termination of the shredding operation, but while continuing the operation of the dispersing drum 11, the discharge valve 41 is opened to allow the level of the water in tank 1 to drop into lower compartment 27. Any shredded or mulched material remaining in the intermediate compartment 25 is flushed into the lower compartment 27 by water supplied through pipeline 43 and valve 45 to the interior of baffle 31 having a series of apertures 47. Water exiting through apertures 47 and remaining mulched material falls into contact with dispersing drum 11 where the mulched material is converted into a fibrous slurry. Upon completion of the fiber dispersing operation the slurry is drained by opening valve 41. Material which may adhere to drum 1 and the bottom of the tank is flushed by water supplied by pipeline 43 through valve 49.

As illustrated in FIG. 2, the disintegrating or shredding drum 3 is formed of a pair of frusto-conical elements 51 and 53, the bases of which are secured together as at 55. The bases may be joined as by welding or preferably are provided with outwardly extending flanges 54 and 56 which are joined by suitable bolts 52. The opposite ends of frusto-conical elements 51 and 53 are closed as by means of end plates 57 and 59 respectively, having integral hubs 61 and 63 and integral ribs 60 and 62, respectively. The drum is secured to shaft 5 by conventional means such as pins (not shown) extending through the hubs 61 and 53 and the shaft 5 or set screws (not shown) in the hubs.

The frusto-conical elements 51 and 53 of the drum are formed of sheet metal, the gauge of the metal being dictated by the type of unit; domestic, commercial, industrial, etc. The apertures 65 in the sheet metal should be of such size as to allow at least some of the shredded fragments to pass into the interior of the drum. A satisfactory type of commercial materail for the production of the elements is conventional metal mesh grating having rectangular or diamond-shaped apertures defined between ribs 67 of the sheet material commonly used in factory stairs and above ground walkways similar in structure to expanded metal lathe. A further structural materials satisfactory for the elements is sheet metal having upstanding ears represented by the common household vegetable shredder.

Although these forms of sheet metal, when bent into the conical configuration present spurs, ears or toothlike projections along the external surface of the conical elements which will effect a tearing and shredding of the fibrous stock, external ribs 69 are secured to the frusto-conical elements so as to more rapidly shred the stock. The ribs may be formed of a variety of specific structures. As illustrated in FIG. 3, the ribs may be in the form of a metal angle 69 preferably having the extending leg 71 serrated. In order to further increase the tearing ability of the rib, pins 73 (only one shown) may be secured to the extending leg. A further modification of the ribs is shown in FIG. 4 where the ribs are formed of a tubular member 75 secured to the frusto-conical element 51. The tube may be secured to the element 51 by means of a screw 77 preferably having a pointed end and extends through element 51 and tube 75. So as to further increase the tearing action of the rib a pointed pin or screw 79 extends horizontally through the tube.

In order to further disintegrate material and fiber clumps which pass into the interior of the shredding drum 3, agitator plates 58 are provided within the shredding drum. As shown in FIG. 5 a "W" shaped agitator plate is mounted on the interior surface of end plate 57. A like "W" shaped agitator plate 58 is mounted on the interior surface of end plate 59. During operation, the agitator plates create sufficient turbulence of the water interior of the drum to cause a continuous circulation of the fragments and fiber clumps and cause them to contact the interior surface of the drum and effect a reduction in the size of the fragments and clumps. The turbulence created also aids in forcing the water-logged fiber clumps through apertures in the drum surface.

So as to prevent a clogging by feed material of the space between the ends of drum 3 and the bearings 7 in intermediate compartment 25, cooperating pins 64 are mounted on ribs 62 of end plate 59 and pins 66 are disposed on the depending skirt 30 of the upper baffle as shown in FIG. 1a. Similarly, pins are mounted on ribs 60 end plate 57 and on the depending skirt of the upper baffle adjacent the opposite end of drum 3. Feed material torn by drum 3 which passes down over the ends of the drum will be carried by the pins 64 on the ribs and will be disintegrated as the material passes the pins 66. The material is thereby unable to build up and clog at the bearing areas.

As shown in FIG. 6 the dispersing drum 11 is formed of the two frusto-conical elements 81 and 83, the bases of which are secured together as at 85. The bases may be joined as by welding or the bases may be provided with outwardly extending flanges and joined by suitable bolts as shown in FIG. 1 for the elements of the disintegrating drum. The opposite ends of the elements 81 and 83 are provided with hubs 87 and 89. The drum is disposed on shaft 13 and fixed to the shaft by conventional means, such as pins extending through the hubs and shaft or set screws in the hubs.

In order to disintegrate the bulky water-logged fibrous clumps which are created by the shredding drum the dispersing drum 11 is provided with a plurality of radially extending ribs 91 and 93 as illustrated in FIGS. 6 and 7. Conventionally, the ribs may be formed of metal angle material, as shown in FIG. 7 and secured to the drum as by welding. The extending legs of the metal angles are provided with a series of spaced slots 95 and 97. The legs may also be provided with perforations 96 and 98 if desired. Alternatively, only slots may be provided or only perforations may be provided. As the water-logged clumps contact the ribs, the masses are forced to pass through the slots and/or perforations thereby becoming separated into smaller fragments producing a fiber slurry.

In operation the tank 1 is filled with water and the fibrous stock material such as waste paper, for example, is added at the top of the tank above baffle 29 and shredding drum 3. After the stock has become water-soaked, the shredding drum is activated whereby the stock becomes torn and shredded into fragments. As rotation of drum 3 is continued, the fragments become mulched and some of the fragments pass into the interior of the drum. The turbulence inside the drum forces the fragments into contact with the internal surface causing a further disintegration of the clumps and forces the smaller clumps through the apertures 65. During this operation the clumps become highly water-logged masses of wet fibers.

The water-logged masses pass from the intermediate compartment 25 into the lower comaprtment 27. Upon contact with the dispersing drum 11 which is rotating at a high speed, the masses are forced through the slots 95 and 97 and/or the perforations 96 and 98 to form a fiber slurry. Upon completion of the operation, valve 41 is opened and the fiber slurry discharged to further processing equipment or into the sewer. Opening of valves 45 and 49 in pipeline 43 will flush any remaining fibrous material from the apparatus.

It is obvious that the operation may be conducted in a continuous manner. In such operation, the tank is filled with water and the shredding-mulching drum 3 and the dispersing drum 11 are activated. Water is supplied continuously to the tank through pipeline 35, the amount of water being regulated by valve 37. A small amount of water is also supplied continuously to baffle 31 through pipeline 43 and 45. Similarly, a small amount of water is supplied to the bottom of the tank through valve 49. Fibrous feed stock material, such as, for example waste newspapers, is added continuously at the top of tank 1. Discharge valve 41 is opened to allow a constant discharge of the fibrous slurry, the discharge being based upon the amount of water and feed material supplied to the tank.

The feed material is torn and shredded into fragments by drum 3. Some of the fragments pass into the interior of the drum. Continued rotation of the drum causes a disintegration and mulching of the fragments which come into contact with the external surface of the drum and the ribs 69 on the drum. Fragments which pass into the interior of the drum become disintegrated and mulched as they are caused to contact the interior surface of the drum due to the turbulence created by the agitator plates 58. The disintegration and mulching of the clumps of feed materials converts the clumps into highly water-logged masses of wet fibers which gradually pass to the bottom of compartment 25 and into compartment 27. Sufficient water is supplied to baffle 31 so that the waters issuing through apertures 47 flush water-logged masses which may settle on the baffle into compartment 27.

The water-logged masses of wet fibers come into contact with the radially extending ribs 91 and 93 on the rapidly rotating dispersing drum 81 in compartment 27. The water-logged masses are forced through the slots and/or apertures in the ribs and separate the fibers in the masses to form a fiber slurry. The slurry exits the tank through pipeline 39, the volume of the slurry being regulated by valve 41. Fibers which may settle on the bottom of the tank are flushed from the tank by water supplied through valve 49.

It is common in producing non-woven water-laid webs from fiber slurries that the slurry contains from about 0.1 to 5% by weight of fibers. In forming slurries of fibers with the present apparatus for use in recycling paper, the consistency or fiber content of the slurry may be regulated by the amount of water supplied to baffle 31.

It is clear that the drawings have been simplified for purposes of illustration. For example, because the structure of sheet metal mesh grating and the common household shredder or grater is well known, drum 3 has been illustrated diagrammatically in the drawings. As is apparent; the various ribs secured to the drums project radially from the surfaces of the drum and extend longitudinally of the drums. The description and the drawings are representative of a preferred apparatus for general application.

In the case of a small domestic type unit intended for use in a home where the waste material consists primarily of newspapers, paper toweling, paper napkins, wrapping paper, paper bags and the like, the apparatus need only include the disintegrating and mulching drum. For such unit, it is obvious that the tank need consist only of an upper compartment and a lower compartment thus eliminating the lower baffle 31, the piping and valve 45 and the dispersing drum 11. In operation, the motor for driving the drum 3 should be a multispeed motor. During the initial disintegrating and shredding operation, the drum is driven at a slow speed. After the feed material has been shredded and mulched into water-logged masses of wet fibers, the drum is then driven at a high speed whereby the water-logged masses become disintegrated to form a fiber slurry.

From what has been described, it will be understood that the waste material pulping apparatus basically comprises:

(a) tank structure having an inlet and an outlet, and forming sequential zones through which waste material passes, including first, second and third zones, (b) a shredding and mulching rotor carried by the tank to rotate in the second zone, said rotor being porous and hollow and having waste mulching ribs positioned to impact and shred waste material passed to the rotor as the rotor rotates so that the shredded waste material passes into the rotor hollow wherein it is mulched as the rotor rotates, (c) means to pass liquid into the tank to penetrate the waste received in the first zone and the shredded waste in the second zone and within the rotor hollow, and to carry the mulched waste into the third zone, (d) a second rotor carried by the tank to rotate in the third zone, and having ribs adapted to impact and disintegrate the mulched waste material received by the second rotor, as it rotates at high speed in said liquid, thereby to form a waste slurry passing to said outlet, (e) and means to rotate said rotors.

In FIG. 8, the numeral 100 refers to the initial entry port of the system, as may be represented by the apparatus of FIGS. 1–7 and the slurry discharge thereof. More generally, it may include mechanical apparatus at input points where substances compatable to the flow system can be properly added, such as a device to apply chewing, mulching, blending, and disintegrating functions. The characteristics of the device are such as to fit the requirements and varying conditions applicable to municipal, industrial, commercial, and domestic sources.

From appratus 100 the slurry may flow at 101 to a waste product processor 102 wherein the slurry may be suitably processed as by adding water to adjust flowability, and/or further mixing, and/or adding chemicals to adjust slurry pH. Input arrow 103 indicates any or all of such additives. The processed slurry then flows at 104 either to a traditional facility 105 via line 104a, or via line 104b directly to a staging zone (tank or tanks) 106 wherein it is held and kept under agitation. Pumps and control valves are indicated at 107–110.

Facility 105 together with stage processor 111 represent utilization of tanks, accelators, injectors, separators, and super blenders, and monitors, wherein the check points at local levels assure the proper control of all system functions. Relief is offered when necessary to assure viscosity, volume, and consistency of the flow substance. Tests and treatment keep system biologically and physically safe and also assure the maximum efficiency in the flow system. Chemicals such as soda ash may be added to the slurry at 112, and water added at 113 to the slurry in processor 111, to achieve good flow consistency.

Slurry is then passed at 114 to agitator processor 115, wherein agitation occurs. A remote adder 116 adds other flowable waste products, as for example shredded carboard and cellulose, vegetable and fruit waste, shrub and tree waste, animal waste which may be processed at 117 before addition to the tanks at 105. Water may be added at 118 to adjust viscosity of the flow. The effluent at 119 is passed via control 119a to the staging zone 106, as via line 104a. Oil refinery sludge or waste may be also be supplied at 120 for flow to the zone 106 via lines 121 and 104a; and apparatus blending agent added as indicated at 122 and 123, to assure slurry quality and continuity.

The discharge from the staging zone is fed at 124 to control 125 and manifold 126; selected density components of the slurry being separately fed or discharged at outlets 126a–126d. Also, at 126 there is storage of flow material from rural and urban zone areas according to flow content and consistency which varies from night to day, and control of the source supply by limiting indescriminate mixing. The mix is controlled for efficiency requirements in the refining process. Bulk and volatile additives are or may be injected into the system on a controlled, regulated basis. Examples are paper, cardboard, magazine and wood waste, farm waste vegetation, industrial waste including oil and gasoline, sewer flow waste and animal waste.

Line 130 from control 125 convery a portion of the processes slurry to storage and treatment tanks 131, via remotely controlled valving 132. The latter may also receive additiona waste material as via line 133, for passage to the tanks. From tanks 131, the slurry is passed at 136 to a processor 137 to separate flow system solids to heaviest consistency or whatever necessary for refining into the products that are usable and compatable with the energy-ecology systems. Line 138 then conveys the slurry to refiner or refiners 140 that incorporate super blenders and processors to make or convert the end flow substances into consumable products such as fuel, synfuel, fertilizers, soil erosion retardants, and high quality absorbant materials. Other by-products are processed into fluids, powders, granules, and solids. FIG. 10 illustrates the processing refining functions of the system. Refining by-products are disclosed at 141, for use by industrial consumers, for example. Such products may for example comprise carbon, cellulose, hydrocarbon fibers, and other solid or powder form hydrocarbons. Refining at 140 may include removal (distillation, fraction, etc.) of $H_2O$ and/or other liquids from the slurry, and compression of remaining solids into cake form. Some or all of the removed liquids or solids (during refining) may be passed via line 142 for further treatment (refining) at 143 and refined solids returned at 144 to the consumer; reject slurry delivered at 145 and 145' for re-cycling to the system at point R; and refine raw bio-material supplied at 146 to bio-refiner 147.

Slurry density fractions (selected) delivered from manifold 126 are passed at 150 to plant storage and flow control or staging apparatus 151, for staging of raw material that is ready for the plant processing. Treating, mixing, blending and segrating occurs for the optimum refinement process. From the latter, flow solids pass at 152 to refining apparatus 153. In the latter, conveyance apparatus carries off the flow solids for reprocessing and/or direct use as fuel or designated as consumable substances at 154. Also conveyance system may move fluid flow substances to additional refiners of gases and fuels and fertilizers. Liquid is returned up stream and recycled.

See also interflow lines 157 and 158 and associated valves 157a and 158a as between the two processing paths indicated by lines 136 and 152. Separator apparatus indicated at 160 withdraws flow substances from the system as at line 157 if and when they are undesirable or hazardous, to assure quality and safety standards within the flow system.

Numeral 162 indicates a mechanical extractor processor to separate fluids and flow solids via mechanical separation, to the desired degree. This apparatus serves as an intermediate processor to prepare the flow substance before entering the refining stages. Drums 163 and 164 rotate in the liquid (slurry) in tank 166 to skim off material (at point 167) from the slurry (which coats drum 163), and pass same at 168 to processor 137. Note pump 170 and valve 171. Heavier liquid or slurry from tank 166 is passed at 172 to the refinery 147. Lighter liquid from the tank passes at 173 to line 152. Slurry passes from control 151 to the tank, via line 174.

FIG. 10 illustrates the combination with refined carbon (i.e. "coal") at 180, of system recovered waste at 154, and refining by-products at 141, to produce synthetic fuel 182 such materials containing carbon, and hydrocarbon, in the form of powder or granules. Modified adders (such as waste paper) may be added, as at 183. The product fuel may be in the form of intermixed, flowable particulate, or compressed into granules, or lumps. The waste flow system is useful for rural, suburban, and urban areas. The system collects, blends, processes, stores, and conveys safe, digestible material within an opne or closed flow system and utilizes the mass substance (be it liquid or solid or combinations) and produces end products of fuel, syn-fuel, fertilizer, soil erosion retardants or processed residue that is biologically safe and usable.

Substances acceptable to the system include: current flow content (rural-urban), cellulose containing products domestic oils and food wastes, industrial hydrocarbon containing waste materials, farm residue of animals and vegetation, urban and suburban garden and estate (vegetation) residue, sawdust, wood chips, hydrocarbon volatile (gasoline, etc.); etc.

System outputs includes: fuel gas, synthetic fuel (blends), solid fuels (powder, pellet, and brisquette), fertilizer, soil and erosion retardants (fibrous material, for example), absorbant materials, etc.

A prime objective of the development of the waste flow system and the design of the pulping apparatus is to arrive at a source of supplemental energy via recycle of products and substances that have been previously regarded as not usable, and as primarily a detriment to human acitivity, via the utilization of the system and process, ecology will be improved through better use of material and industrial waste products, and recovered energey provided. Some relief of the "Green House" dilemma is also contemplated, through widespread use of the system.

Finally, this application incorporates applicant's Disclosure Document filed Oct. 3, 1984.

I claim:

1. Waste paper pulping apparatus copmrising:
   (a) a tank open at its upper end and closed at its bottom end; a pair of spaced baffles within the tank that divide the tank into an upper compartment, a lower compartment and an intermediate compartment between the upper and lower compartments; means for supplying water into the upper compartment; a rotatable disintegrating and mulching drum disposed within the intermediate compartment and extending partially into the upper compartment, the disintegrating and mulching drum comprising sheet metal having apertures therein, ribs secured to the sheet metal and extending outwardly from the sheet metal, and outwardly projecting spurs on the ribs; a rotatable dispersing drum disposed within the lower compartment, the dispersing drum comprising a pair of frusto-conical members joined to each other at their bases, a hub secured to each end opposite each base of each frusto-conical member and supporting its respective frusto-conical member on a rotatable shaft, a plurality of ribs having slots therein and being secured, in spaced radial relationship with respect to each other, to and projecting radially outwardly from surfaces of the frusto-conical members, said ribs extending longitudinally along the frusto-conical members, means for discharging a fibrous slurry from an outlet at the bottom end of the tank,
   (b) and including slurry processing means downstream of said outlet for processing said slurry into solid form, usable end product waste material.

2. The apparatus of claim 1 including means to combine said end product waste material in particle form with at least one of the following:
   (i) coal particles to form an at least partially synthetic fuel;
   (ii) oil and solvents;
   (iii) coal particles and oil:
   (iv) waste gas extraction.

3. The apparatus of claim 1 including means to receive said usable end product waste material from said processing means, said end product waste material selected from the group that includes:
   fuel
   synthetic fuel
   fertilizer
   soil erosion retardant
   processed residue
   cellulose
   absorbent fibrous material.

4. The apparatus of claim 1 including waste material received by the tank, and which material is selected from the group that includes
   cellulose containing products
   oils, volatile substances
   food waste
   industrial waste with hydrocarbon content
   garden and farm and fruit waste
   shrub and tree waste
   animal waste.

5. The apparatus of claim 1 wherein said processing means includes intercommunicating holding and treating tanks and lines, and processing and refining equipment.

6. The apparatus of claim 5 wherein said processing means has end delivery paths for consumable by-products in different forms.

7. The apparatus of claim 5 wherein said processing means includes the following, connected in sequence:
   treatment equipment
   processor apparatus
   agitator processor
   staging zone and control equipment
   extractor apparatus.

8. The apparatus of claim 7 wherein said staging zone and control equipment has first and second discharge outlets, and
   (i) there being the following in a first path and connected in sequence with one of said outlets:
      storage and control equipment
      refinery means producing consumable by-product
   (ii) there being the following in a second path and connected in sequence with the other of said outlets:
      storage and control equipment
      processing equipment
      refinery means producing consumable by-product.

9. The apparatus of claim 12 including flow sub-paths connected between said first and second paths, and flow control and treatment equipment connected in said sub-paths.

* * * * *